(12) United States Patent
Novo Diaz

(10) Patent No.: US 12,418,582 B2
(45) Date of Patent: Sep. 16, 2025

(54) LWM2M SERVER DEVICE, LWM2M CLIENT DEVICE, AND METHODS THEREOF

(71) Applicant: Telefonaktiebolaget LM Ericsson (publ), Stockholm (SE)

(72) Inventor: Oscar Novo Diaz, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 17 days.

(21) Appl. No.: 18/034,741

(22) PCT Filed: Nov. 2, 2020

(86) PCT No.: PCT/EP2020/080662
§ 371 (c)(1),
(2) Date: May 1, 2023

(87) PCT Pub. No.: WO2022/089766
PCT Pub. Date: May 5, 2022

(65) Prior Publication Data
US 2023/0403320 A1    Dec. 14, 2023

(51) Int. Cl.
*H04L 67/104* (2022.01)
*H04L 67/00* (2022.01)
*H04L 67/125* (2022.01)

(52) U.S. Cl.
CPC ........ *H04L 67/1044* (2013.01); *H04L 67/125* (2013.01); *H04L 67/34* (2013.01)

(58) Field of Classification Search
CPC ... H04L 67/1044; H04L 67/125; H04L 67/34; H04L 67/55
See application file for complete search history.

(56) References Cited

U.S. PATENT DOCUMENTS

2013/0160140 A1* 6/2013 Jin ............... H04L 63/0407 726/27
2013/0315389 A1* 11/2013 Jung ............. H04W 12/0431 380/31

(Continued)

OTHER PUBLICATIONS

ESR030—"LWM2M-MQTT-1.0 LWM2M over MQTT Profile Specification", ESR Consortium, Feb. 8, 2017, pp. 1-19, XP055811258) (Year: 2017).*

(Continued)

*Primary Examiner* — Chris Parry
*Assistant Examiner* — Dixon F Dabipi
(74) *Attorney, Agent, or Firm* — Rothwell, Figg, Ernst & Manbeck, P.C.

(57) ABSTRACT

A Lightweight Machine to Machine (LwM2M) server device is disclosed that is operable to run a LwM2M server and a Message Queueing Telemetry Transport (MQTT) client. The LwM2M server device comprises processing circuitry configured to cause the LwM2M server device to determine that a LwM2M management operation should be performed on LwM2M clients fulfilling a criterion, and to identify a LwM2M group management topic corresponding to the criterion, a LwM2M group management topic comprising a topic within a LwM2M namespace that is nonspecific to a particular LwM2M endpoint. The processing circuitry is further configured to cause the LwM2M server device to publish a group management message to an MQTT server, the group management message specifying the identified LwM2M group management topic and the management operation to be performed.

21 Claims, 12 Drawing Sheets

(56) References Cited

U.S. PATENT DOCUMENTS

2016/0196132 A1* 7/2016 Searle .................. G06F 8/65
                                                    717/173
2020/0067865 A1* 2/2020 Jiménez ............... H04L 51/216

OTHER PUBLICATIONS

International Search Report and Written Opinion issued in International Application No. PCT/EP2020/080662 dated Jun. 16, 2021 (19 pages).
ESR Consortium, "LWM2M-MQTT-1.0 over MQTT Profile Specification", XP055811258, Feb. 8, 2017 (19 pages).
OMA, "Lightweight Machine to Machine Technical Specification; OMA-TS-LightweightM2M-V1_0-20160407-C", XP064188759, Apr. 7, 2016 (127 pages).
OMA, "Lightweight Machine to Machine Technical Specification; OMA-TS-LightweightM2M-V1_0-20170208-A", XP064190536, Feb. 8, 2017 (138 pages).
OMA, "Lightweight Machine to Machine Requirements", XP064192064, Nov. 14, 2017 (45 pages).
Huawei, "Proposal for MBMS Group Service Announcement in LwM2M 1.1", XP064191424 (9 pages).
"Index of /download/ specification", XP055811260, Dec. 12, 2018 (1 page).
Oma, Lightweight Machine to Machine Technical Specification: Transport Bindings; OMA-TS-LightweightM2M_Transport-V1_2-20201019-A, Oct. 10, 2019 (107 pages).
MQTT, The Wayback Machine—https://web.archive.org/web/20200710002631/http://mqtt.org:80/documentation, Jan. 29, 2023 (1 page).

* cited by examiner

LWM2M SERVER DEVICE, LWM2M CLIENT DEVICE, AND METHODS THEREOF

CROSS REFERENCE TO RELATED APPLICATIONS

This application is a 35 U.S.C. § 371 National Stage of International Patent Application No. PCT/EP2020/080662, filed 2020 Nov. 2.

TECHNICAL FIELD

The present disclosure relates to a Lightweight Machine to Machine (LwM2M) server device and to a LwM2M client device. The present disclosure also relates to methods performed by a LwM2M server device and a LwM2M client device, and to a corresponding computer program, a corresponding carrier, and a corresponding computer program product.

BACKGROUND

The "Internet of Things" (IoT) refers to systems of devices enabled for communication network connectivity, so that these devices may be remotely managed, and data collected or required by the devices may be exchanged between individual devices and between devices and application servers. A popular vision of IoT comprises large numbers of such small autonomous devices, transmitting and receiving small amounts of data, typically relatively infrequently. IoT devices, examples of which may include sensors and actuators, are often although not necessarily, subject to severe limitations on processing power, storage capacity, energy supply, device complexity and/or network connectivity, imposed by their operating environment or situation, and may consequently be referred to as constrained devices. Constrained devices may operate according to a range of protocols, including widely used protocols such as Internet Protocol (IP) v4 or IPv6, and dedicated protocols for constrained devices, including for example the Constrained Application Protocol (CoAP) and Message Queueing Telemetry Transport (MQTT).

Lightweight M2M (LwM2M) is an application layer protocol defined by the Open Mobile Alliance (OMA) standardisation body for managing resource-constrained devices (IoT devices). LwM2M defines a protocol between a LwM2M Server and a LwM2M Client. According to the LwM2M specification, a LwM2M client is a component running on a device implementing the client-side functionality of the LwM2M protocol for interacting with a LwM2M Server and a LwM2M Bootstrap-Server. LwM2M Clients are often implemented in IoT devices and gateways. A LwM2M server is a component implementing the server-side functionality of the LwM2M protocol for interacting with a LwM2M Client. LwM2M Server software is often, although not necessarily, running on a non-IoT device, such as an on-premise server or in a cloud-based infrastructure. A LwM2M device is a computing device that operates a LwM2M client or LwM2M server. LwM2M includes several interfaces to manage LwM2M devices, including a bootstrap interface, a registration interface, a device management and service enablement interface, and an information reporting interface. The interfaces and the LwM2M architecture are illustrated in FIG. 1, which shows a LwM2M server 110, a LwM2M client running on an M2M device 120, and the interfaces between these entities that are defined in the LwM2M specification.

LwM2M was originally designed to run over CoAP, but the latest version of the LwM2M specification (version 1.2), introduces the MQTT transport binding in the LwM2M interfaces. MQTT is a lightweight publish-subscribe messaging transport protocol designed for constrained devices and low-bandwidth, high-latency or unreliable networks. MQTT is lightweight, open, simple, and designed to be easy to implement. MQTT has a small code footprint, each message consisting of a fixed header (2 bytes), an optional variable header, a message payload that is limited to 256 MB of information, and a quality of service level (QoS). An MQTT system consists of MQTT clients communicating with an MQTT server, also known as an MQTT broker.

According to the latest version of the LwM2M specification (version 1.2), there exist two different deployment modes for LwM2M over MQTT: co-located MQTT server/LwM2M server deployment, and independent MQTT server deployment. Co-located MQTT server/LwM2M server deployment closely reassembles the architecture of LwM2M, with the MQTT server co-located with the LwM2M Server, and consequently running on the same device or computing entity. Independent MQTT server deployment envisages the MQTT server as a separate logical entity, operated independently of the LwM2M server and LwM2M bootstrap server. FIG. 2 illustrates independent MQTT server deployment, in which it can be seen that the MQTT server 250 is operated independently of the other entities illustrated. As illustrated in FIG. 2, each of the LwM2M server 210, application server 220, LwM2M bootstrap server 230 and LwM2M clients 240 run an MQTT client, in order to communicate with the MQTT server 250.

An MQTT session is divided into three stages: connection, communication and termination. For LwM2M over MQTT, a LwM2M client starts by creating a connection to the LwM2M server. The connection can be secured using TLS, although as the MQTT protocol aims to be a protocol for resource constrained devices, TLS might not always be possible, or desirable. In such circumstances, other types of authentication can be used, and some LwM2M servers will also accept anonymous LwM2M clients.

During the communication phase, a client can perform publish, subscribe, and unsubscribe operations. The publish operation sends content to a topic that is defined by the publisher, the content taking a format that is application specific. The content is forwarded by the MQTT broker to subscribers of the topic. When a publisher or subscriber wants to terminate an MQTT session, it sends a DISCONNECT message to the LwM2M server and then closes the connection.

Version 1.2 of the LwM2M specification thus establishes how LwM2M may be implemented over MQTT, defining one-to-one communication between LwM2M servers and clients, and enabling MQTT servers to be configured so that messages addressed to a specific client are forwarded only to that client. However, in deployments involving large numbers of LwM2M devices, a common situation for IoT use cases, LwM2M over MQTT involves the exchange of a large number of messages, as current device management and information reporting are carried out via one-to-one communication as outlined above. This high volume of message traffic can place a strain resources of the network over which they are sent, which network may itself be constrained.

SUMMARY

It is an aim of the present disclosure to provide a LwM2M client device, a LwM2M server device, methods and a computer readable medium which at least partially address one or more of the challenges discussed above.

According to a first aspect of the present disclosure, there is provided a Lightweight Machine to Machine (LwM2M) server device operable to run a LwM2M server and a Message Queueing Telemetry Transport (MQTT) client. The LwM2M server device comprises processing circuitry configured to cause the LwM2M server device to determine that a LwM2M management operation should be performed on LwM2M clients fulfilling a criterion, and to identify a LwM2M group management topic corresponding to the criterion. The processing circuitry is further configured to cause the LwM2M server device to publish a group management message to an MQTT server, the group management message specifying the identified LwM2M group management topic, and the management operation to be performed, wherein a LwM2M group management topic comprises a topic within a LwM2M namespace that is nonspecific to a particular LwM2M endpoint.

According to another aspect of the present disclosure, there is provided a LwM2M client device operable to run a LwM2M client and an MQTT client. The LwM2M client device comprises processing circuitry configured to cause the LwM2M client device to receive a group management message published by a LwM2M server and forwarded to the LwM2M client device by an MQTT server, the group management message specifying a LwM2M group management topic and a management operation to be performed by the LwM2M client device. The processing circuitry is further configured to cause the LwM2M client device to initiate performance of the management operation, wherein a LwM2M group management topic comprises a topic within a LwM2M namespace that is nonspecific to a particular LwM2M endpoint.

According to another aspect of the present disclosure, there is provided a method performed by a LwM2M server device operable to run a LwM2M server and an MQTT client. The method comprises determining that a LwM2M management operation should be performed on LwM2M clients fulfilling a criterion and identifying a LwM2M group management topic corresponding to the criterion. The method further comprises publishing a group management message to an MQTT server, the group management message specifying the identified LwM2M group management topic and the management operation to be performed, wherein a LwM2M group management topic comprises a topic within a LwM2M namespace that is nonspecific to a particular LwM2M endpoint.

According to another aspect of the present disclosure, there is provided a method performed by a LwM2M client device operable to run a LwM2M client and an MQTT client. The method comprises receiving a group management message published by a LwM2M server and forwarded to the LwM2M client device by an MQTT server, the group management message specifying a LwM2M group management topic and a management action to be performed by the LwM2M client device. The method further comprises initiating performance of the management operation, wherein a LwM2M group management topic comprises a topic within a LwM2M namespace that is nonspecific to a particular LwM2M endpoint.

According to another aspect of the present disclosure, there is provided a computer program comprising instructions which, when executed on at least one processor, cause the at least one processor to carry out a method according to any one of the aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

Aspects and examples of the present disclosure thus enable group management of LwM2M devices over MQTT. As noted above, LwM2M currently defines one-to-one communication between LwM2M servers and clients over MQTT, leading to heavy message traffic when managing large deployments of devices. The group management afforded by examples of the present disclosure, enabling the sending of the same management information to multiple LwM2M clients, offers a far more efficient solution for management of multiple devices, so preserving resources of the devices and the network over which they communicate.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Figure 1:
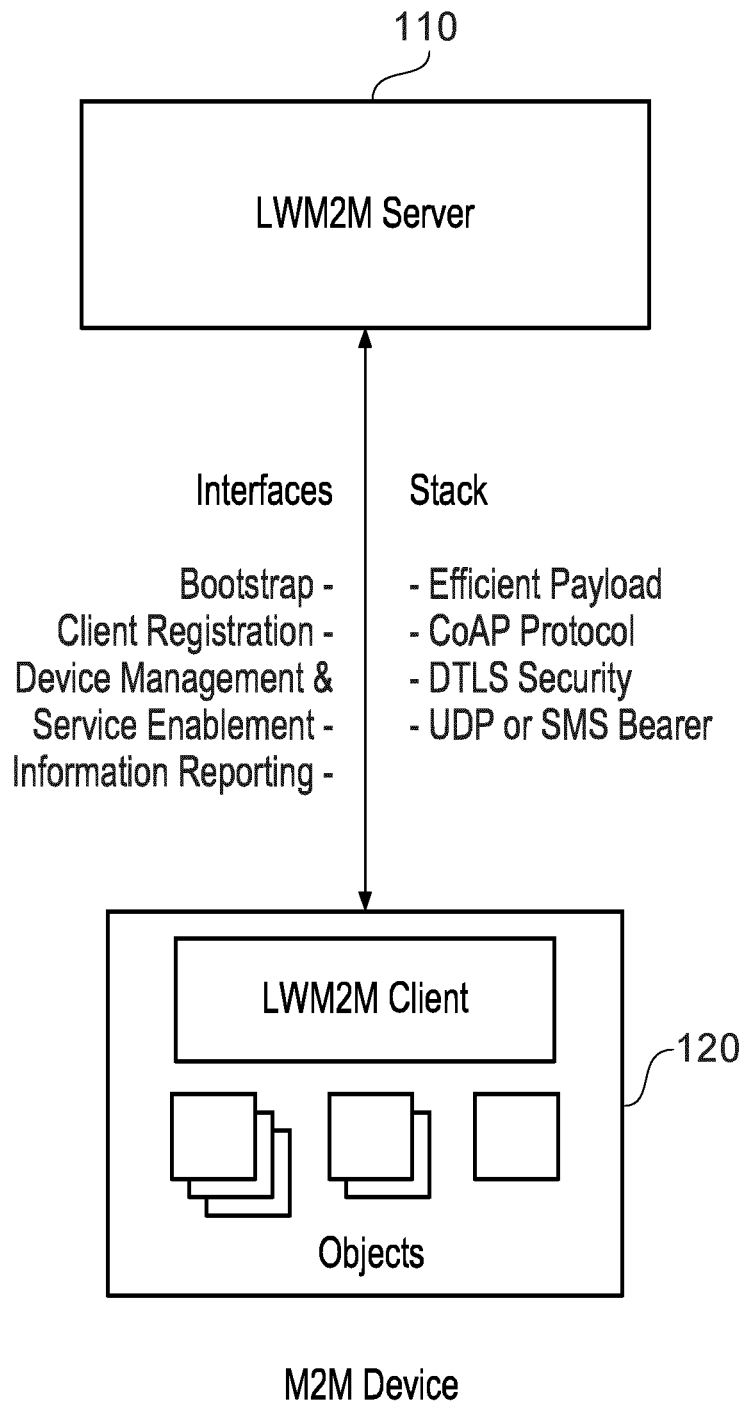
FIG. 1 illustrates the LwM2M architecture and interfaces.
Figure 2:
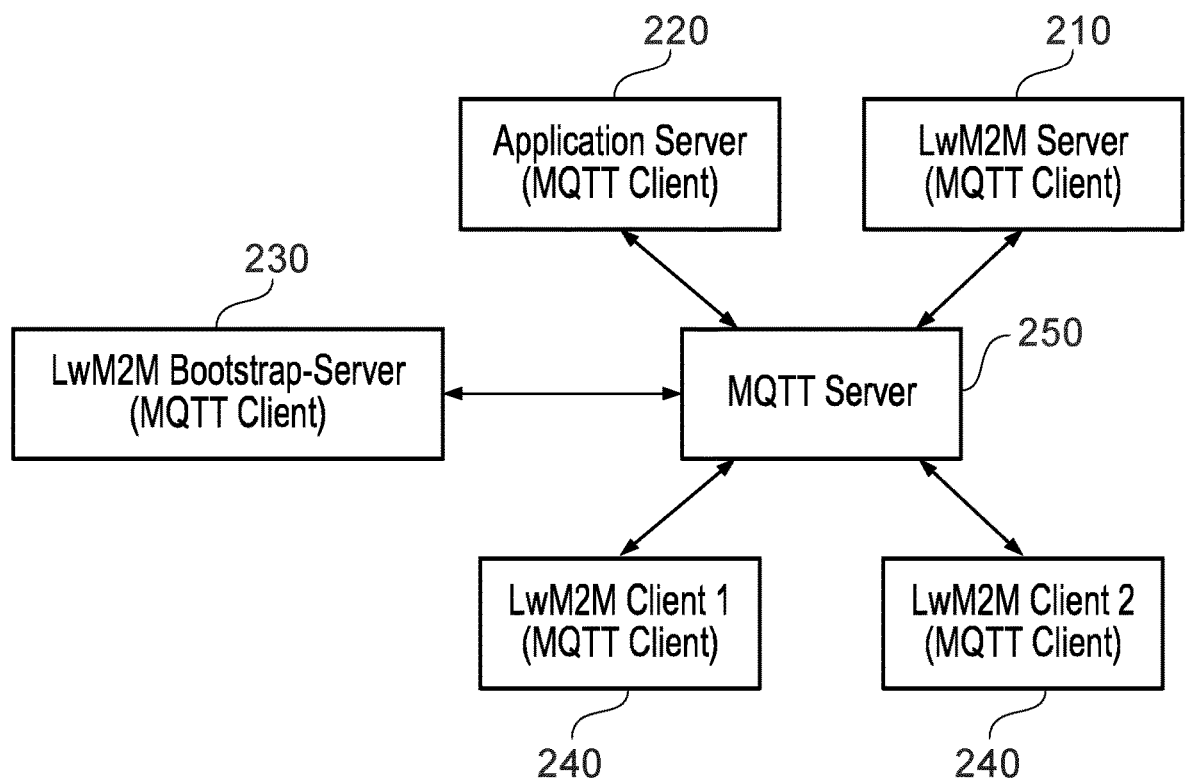
FIG. 2 illustrates independent MQTT server deployment in LwM2M over MQTT.

As discussed above, examples of the present disclosure propose new operations and sequence diagrams for the device management and registration interfaces of LwM2M over MQTT. These new operations enable group management in LwM2M over MQTT. According to examples of the present disclosure, LwM2M group management topics are introduced, with multiple LwM2M clients able to subscribe to the same LwM2M group management topic. The LwM2M server managing a plurality of LwM2M clients can publish messages to a LwM2M group management topic to which those clients subscribe. Once the MQTT server receives the messages, it will distribute them among all the LwM2M clients that are subscribed to that particular LwM2M group management topic. According to further examples, LwM2M clients may subscribe to multiple LwM2M group management topics, further increasing efficiency. Each LwM2M client may then be managed through the use of messages published to various different group management topics. LwM2M group management topics relating to security, particular locations, particular device types, firmware updates, and many other options may be envisaged.

To provide additional context for the present disclosure, there now follows a brief discussion of how topics are used in MQTT. In MQTT, the word topic refers to a UTF-8 string that the MQTT server uses to filter messages for each connected client. Message routing in MQTT is therefore accomplished via topics. When an MQTT client (also referred to in this instance as a publisher) has a new data item to distribute, it sends a publish message to its connected MQTT server. The message contains the data that the MQTT client wishes to publish and is marked with a topic. The MQTT server distributes the published information to any MQTT clients that have subscribed to that topic. Topic strings form a natural topic tree with the use of a special delimiter character, the forward slash (/). A client can subscribe to (and unsubscribe from) entire branches in a topic tree. The structure of topics for LwM2M over MQTT is defined in the LwM2M specification version 1.2 as follows:

topic=[PREFIX "/"] "lwm2m/" ("bs"/"rd") "/" END-POINT

The topic structure has several static strings, namely "lwm2m", "/", "bs", and "rd". The string "lwM2M" defines the LwM2M topic namespace, and avoids topic naming conflicts with non-LwM2M use of the MQTT infrastructure. For the LwM2M bootstrap interface, the topic string "bs" is used; all other interfaces use the string "rd". "bs" and "rd" therefore allow an MQTT server to segment traffic towards a LwM2M bootstrap server and to a LwM2M Server, respectively. The inclusion of the endpoint name in the LwM2M topic structure defined in version 1.2 of the LwM2M specification ensures that LwM2M over MQTT according to the specification is a one-to-one communication, as each topic is by definition specific to a particular endpoint. This is in contrast to the LwM2M group management topics introduced by the present disclosure, which are defined as topics within the LwM2M namespace that are nonspecific to a particular endpoint (that is to a particular LwM2M client or server).

Figure 3:
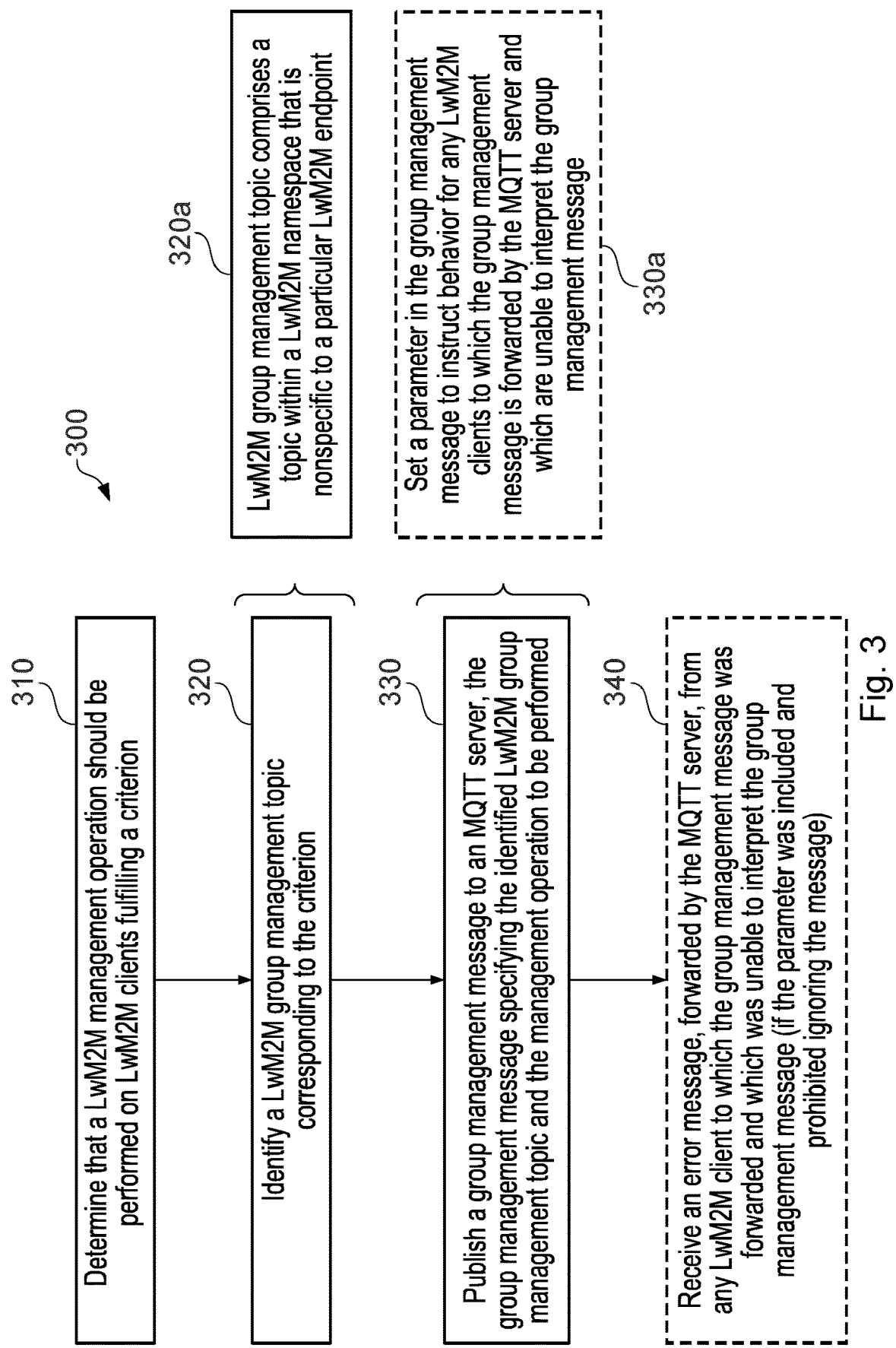
FIG. 3 is a flow chart illustrating process steps in a method performed by a LwM2M server device.

FIG. 3 is a flow chart illustrating process steps in a method 300 performed by a LwM2M server device. The LwM2M server device comprises a logical LwM2M server component and support on which the logical component is running. The LwM2M server device may comprise a computing device or other computing architecture or physical computing entity that operates a LwM2M server. The LwM2M server device is also operable to run an MQTT client.

Referring to FIG. 3, the method 300 comprises, in a first step 310, determining that a LwM2M management operation should be performed on LwM2M clients fulfilling a criterion. The management operation may be any operation used by the LwM2M device management and service enablement interface. The criterion fulfilled by the LwM2M clients may relate to the devices on which the clients are running (for example device type, remaining battery power etc.), to a location in which the clients are deployed such as a building, site, room etc., to a security level associated with the LwM2M clients, or to any other aspect of the clients, the devices on which they are running and/or their deployment. The method 300 further comprises, in step 320, identifying a LwM2M group management topic corresponding to the criterion. As illustrated in 320a, a LwM2M group management topic comprises a topic within a LwM2M namespace that is nonspecific to a particular LwM2M endpoint. In step 330, the method 300 comprises publishing a group management message to an MQTT server, the group management message specifying the identified LwM2M group management topic and the management operation to be performed. The method 300 thus enables group management of LwM2M clients over MQTT, through the use of LwM2M group management topics. The criterion fulfilled by clients in the method 300 provides the link between the LwM2M client devices to be managed and the group management topic which is used to publish information to all of the relevant LwM2M clients.

As illustrated at step 330a, the step 330 of publishing a group management message to an MQTT server may comprise setting a parameter in the group management message to instruct behaviour for any LwM2M clients to which the group management message is forwarded by the MQTT server and which are unable to interpret the group management message. A LwM2M client device which is unable to interpret the group management message may for example be able to receive the message but may be unable to act upon it, to determine what is instructed by the message, and/or to otherwise fulfil the management operation determined by the LwM2M server in step 310 and specified in the group management message. The parameter, referred to in discussion below as the "ignore" parameter, may for example indicate whether a LwM2M client that is unable to interpret the group management message may simply ignore the message, or should send an error message back to the MQTT server that forwarded the group management message, or should execute any other behaviour, depending on whether or not the parameter is present, and what value the parameter is set to if present.

Referring still to FIG. 3, the method 300 may further comprise step 340, if the parameter is set in the group management message and indicates that any LwM2M clients to which the group management message is forwarded by the MQTT server and which are unable to interpret the group management message may not ignore the group management message. Step 340 comprises receiving an error message, forwarded by the MQTT server, from any LwM2M client to which the group management message was forwarded and which was unable to interpret the group management message.

As discussed above, a LwM2M client is a logical component running on a device implementing the client side functionality of the LwM2M protocol for interacting with a LwM2M Server and a LwM2M Bootstrap-Server. A LwM2M server is a logical component implementing the server-side functionality of the LwM2M protocol for interacting with a LwM2M Client. A LwM2M Server component may be running on a physical server, communication network component or may be hosted on a cloud infrastructure. For the purposes of the present disclosure, a LwM2M server device refers to the logical LwM2M server component and to the support on which it is running. In this context, "device" may encompass an IoT device, a server, a communication network component, one or more elements of a cloud infrastructure etc.

A LwM2M device thus refers to a computing device or other computing architecture or physical computing entity that operates a LwM2M client or LwM2M server. The terms LwM2M server/LwM2M server device, and LwM2M client/LwM2M client device, may be used interchangeably in the present specification. Where reference is made to actions performed by a LwM2M client or a LwM2M server, it will be understood that such actions are carried out by the logical LwM2M client or LwM2M server component being operated on the relevant device. Where reference is made to actions performed by a LwM2M client device or a LwM2M server device, it will be understood that such actions may be carried out by the logical LwM2M client or LwM2M server running on the relevant device.

Figure 4:
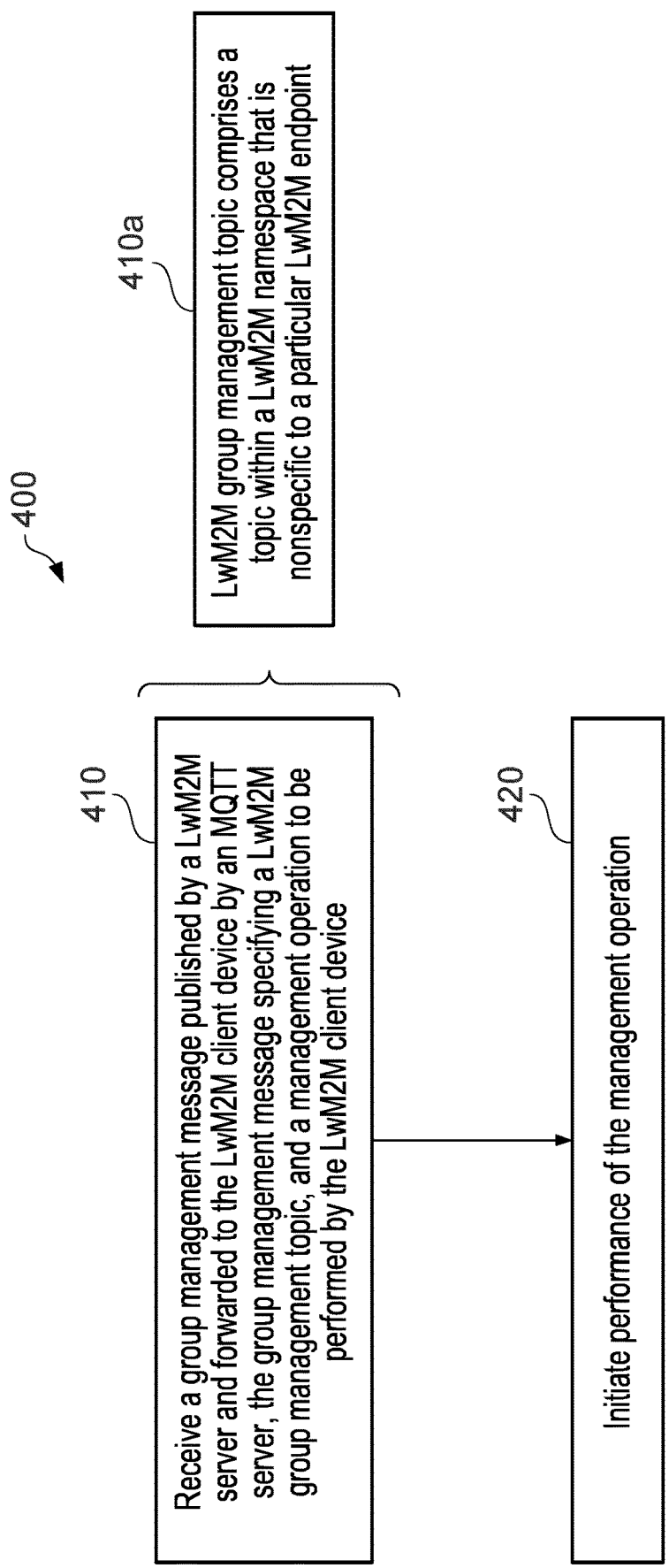
FIG. 4 is a flow chart illustrating process steps in a method performed by a LwM2M client device.

The method 300 may be complemented by a method 400 performed by a LwM2M client device as illustrated in FIG. 4. The LwM2M client device comprises a computing device that is operable to run a LwM2M client and to run an MQTT client. The LwM2M client device may comprise an IoT device, and may be a constrained device.

Referring to FIG. 4, the method 400 comprises, in a first step 410, receiving a group management message published by a LwM2M server and forwarded to the LwM2M client device by an MQTT server, the group management message specifying a LwM2M group management topic and a management operation to be performed by the LwM2M client device. As illustrated at 410a, a LwM2M group management topic comprises a topic within a LwM2M namespace that is nonspecific to a particular LwM2M endpoint. In step 420, the method 400 comprises initiating performance of the management operation.

The method 400 thus involves a LwM2M client device receiving and acting upon a group management message as may be sent by a LwM2M server device according to the method 300. The group management message is forwarded to the LwM2M client device by an MQTT broker.

Figure 5A:
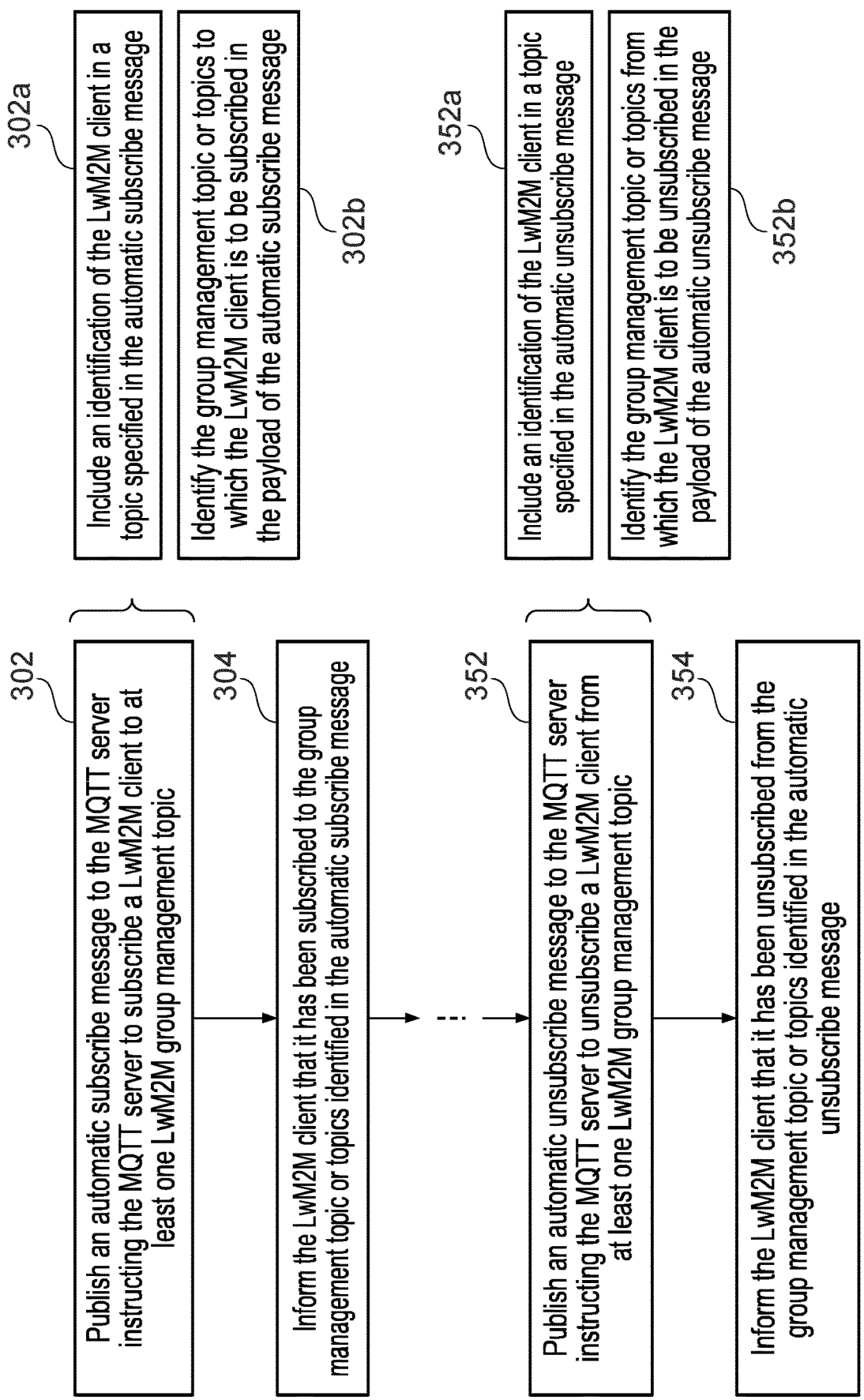
FIGS. 5a and 5b illustrate further process steps that may be included in the method of FIG. 3.
Figure 5B:
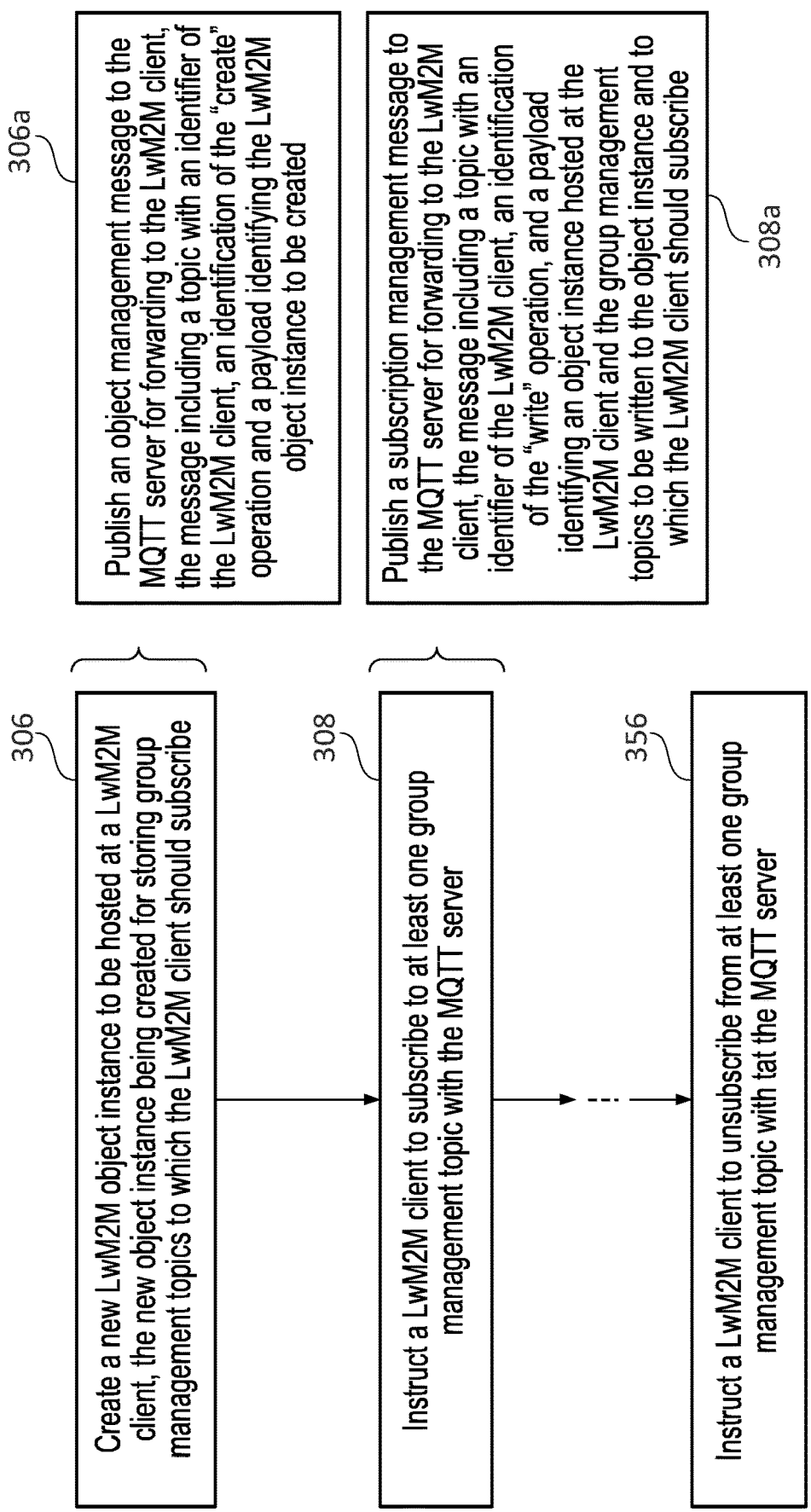

FIGS. 5a and 5b show a flow chart illustrating further process steps that may be included in the method 300 performed by a LwM2M server device. FIGS. 5a and 5b illustrate alternative options for managing the subscription of a LwM2M client device to one or more LwM2M group management topics. FIG. 5a illustrates an option according to which a LwM2M server device uses a new "automatic subscription" procedure to cause a LwM2M client device to be subscribed and/or unsubscribed to/from one or more group management topics with an MQTT server. FIG. 5b illustrates an option in which a LwM2M client device is instructed by the LwM2M server device to subscribe and/or unsubscribe to/from group management topics directly with the MQTT server concerned. FIGS. 5a and 5b present additional steps in the method 300, which may take place before and/or after the steps illustrated in FIG. 3.

Referring first to FIG. 5a, according to the proposed automatic subscription procedure, the LwM2M server device first publishes, in step 302, an automatic subscribe message to the MQTT server, instructing the MQTT server to subscribe a LwM2M client to at least one LwM2M group management topic. As illustrated at 302a and 302b, the LwM2M server device may include an identification of the LwM2M client in a topic specified in the automatic subscribe message, and identify the group management topic or topics to which the LwM2M client is to be subscribed in the payload of the automatic subscribe message. In some examples, the LwM2M server device may then, in step 304, inform the LwM2M client that it has been subscribed to the group management topic or topics identified in the automatic subscribe message. Step 304 may in some examples be conditional upon receiving confirmation from the MQTT server that the LwM2M client has been subscribed to the relevant topics. The LwM2M server device may inform the LwM2M client device in step 304 via a message published to the MQTT server for forwarding to the LwM2M client (for example through use of a LwM2M client specific topic as set out in version 1.2 of the LwM2M specification).

Steps 352 and 534 illustrate the automatic subscription procedure for unsubscribing a LwM2M client device from one or more group management topics. In some examples, such steps may take place after completion of one or more repetitions of the steps illustrated in FIG. 3. In other examples, a LwM2M client device may be subscribed to one or more group management topics and unsubscribed from one or more group management topics (which may or may not overlap with the topics to which the LwM2M client device was subscribed in the preceding steps), all before a group management message is published and forwarded to the LwM2M client device.

In step 352, a LwM2M server device may publish an automatic unsubscribe message to the MQTT server instructing the MQTT server to unsubscribe a LwM2M client from at least one LwM2M group management topic. As illustrated at 352a and 352b, the LwM2M server device may include an identification of the LwM2M client in a topic specified in the automatic unsubscribe message, and identify the group management topic or topics from which the LwM2M client is to be unsubscribed in the payload of the automatic unsubscribe message. In step 354, the LwM2M server device may inform the LwM2M client that it has been unsubscribed from the group management topic or topics identified in the automatic unsubscribe message. In some examples, the informing step 354 may be conditional upon receiving confirmation from the MQTT server that the LwM2M client device has been unsubscribed from the relevant topic or topics.

As discussed above, FIG. 5b illustrates a subscription option in which the LwM2M server device instructs a LwM2M client device to subscribe to and/or unsubscribe from one or more group management topics. Referring to FIG. 5b, in a first step 306, the LwM2M server device may create a new LwM2M object instance to be hosted at the LwM2M client, the new object instance being created for storing group management topics to which the LwM2M client should subscribe. As illustrated at 306a, this may comprise publishing an object management message to the MQTT server for forwarding to the LwM2M client. The object management message includes a topic including an identifier of the LwM2M client, an identification of the "create" management operation, and a payload including an identification of the LwM2M object instance to be created.

In step 308, the LwM2M server device may instruct a LwM2M client to subscribe to at least one group management topic with the MQTT server. As illustrated at 308a, this may comprise publishing a subscription management message to the MQTT server for forwarding to the LwM2M client. The subscription management message includes a topic including an identifier of the LwM2M client, an identification of the "write" management operation, and a payload including an identification of an object instance hosted at the LwM2M client on which the write operation is to be performed and the group management topics to be written to the object instance and to which the LwM2M client should subscribe. The object instance to be written to may be the object instance created at step 306.

In step 356, the LwM2M server device may instruct a LwM2M client to unsubscribe from at least one group management topic at the MQTT server. As discussed above with reference to FIG. 5a, the subscription step 356 may take place after completion of one or more repetitions of the steps illustrated in FIG. 3. In other examples, a LwM2M client device may be instructed to subscribe to one or more group management topics, and instructed to unsubscribe from one or more group management topics (which may or may not overlap with the topics to which the LwM2M client device was instructed to subscribe in the preceding steps), all before a group management message is published and forwarded to the LwM2M client device.

Figure 6A:
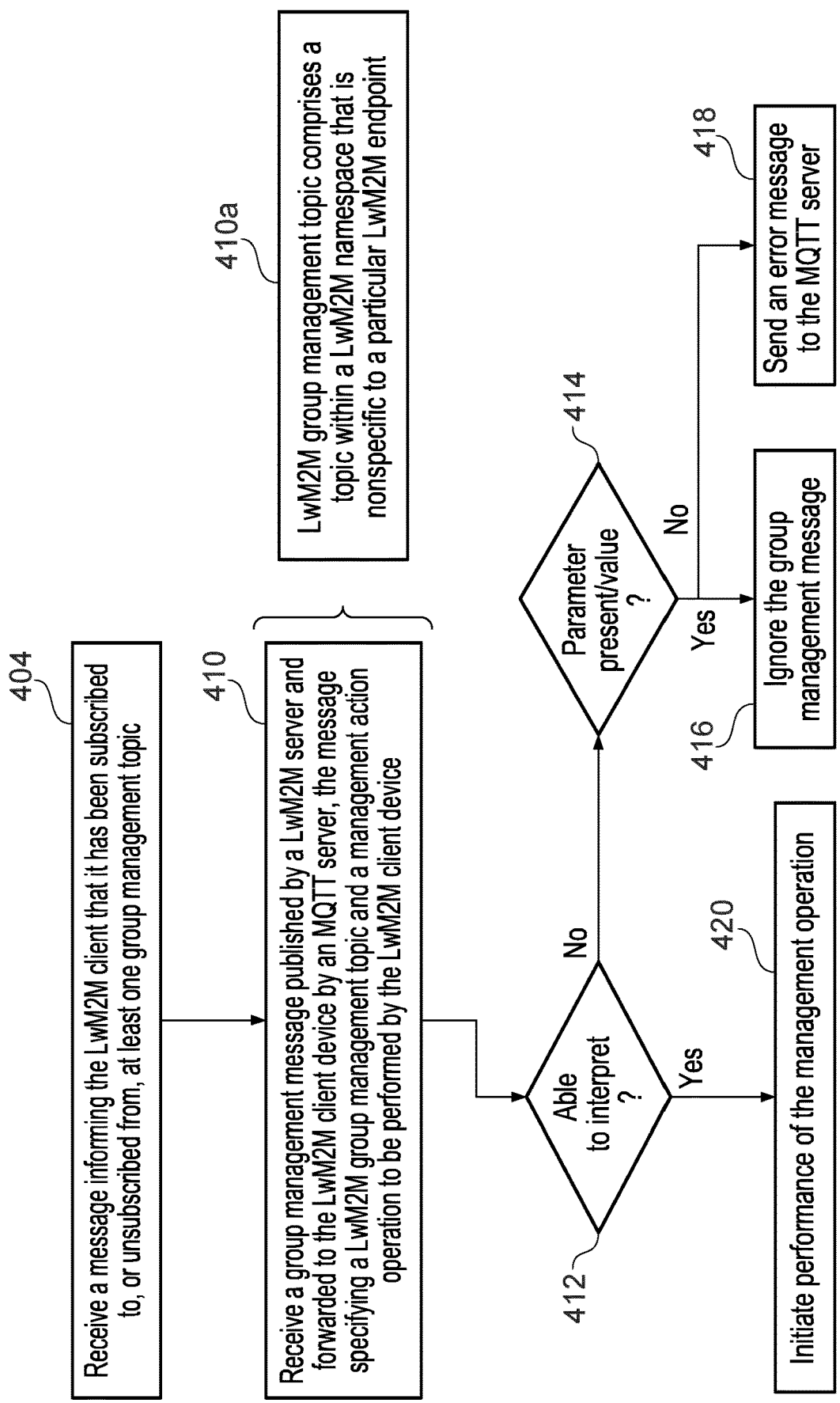
FIGS. 6a and 6b illustrate further process steps that may be included in the method of FIG. 4.
Figure 6B:
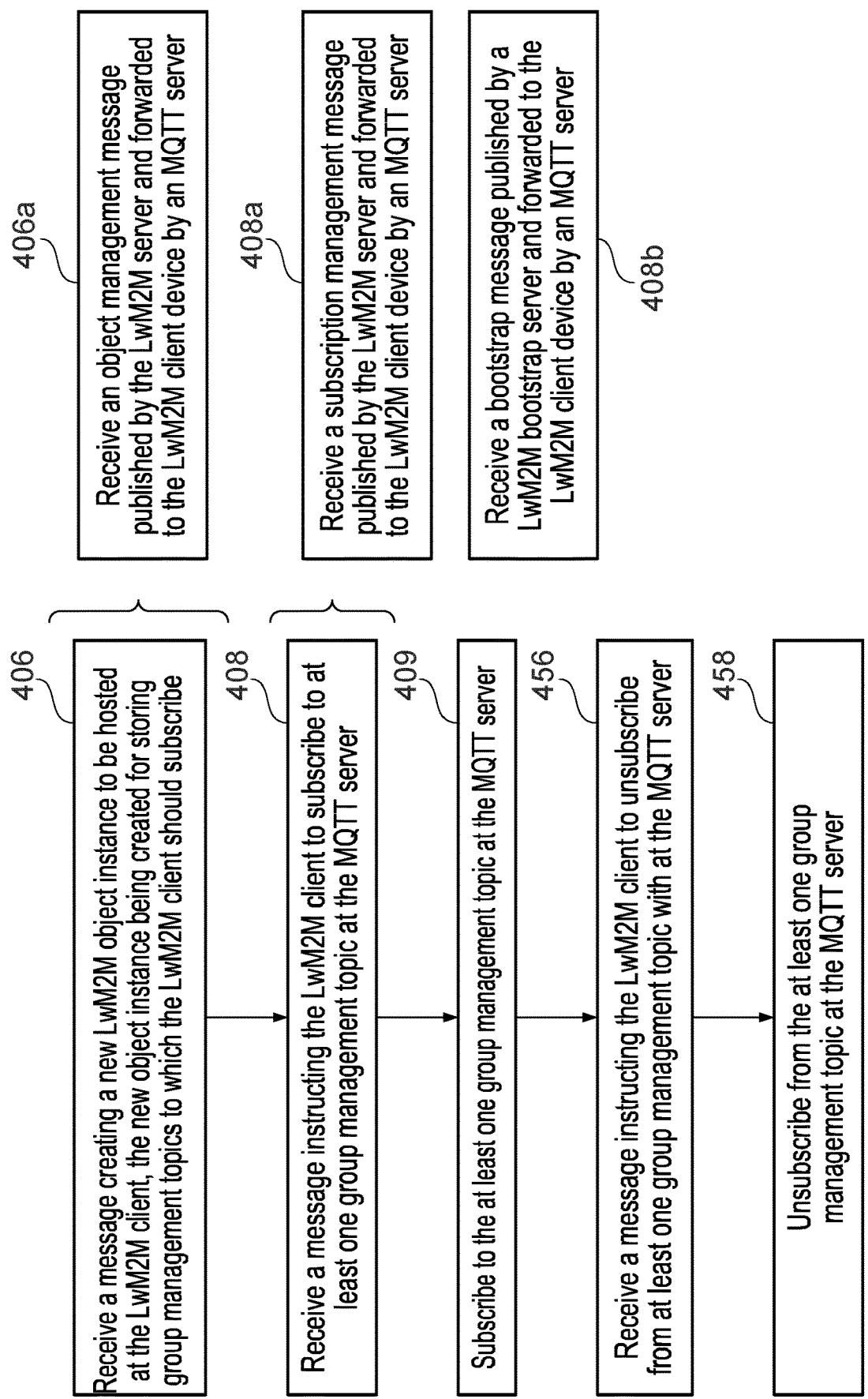

FIGS. 6a and 6b show a flow chart illustrating further process steps that may be included in the method 400 performed by a LwM2M client device. FIGS. 6a and 6b illustrate how the alternative options for managing the subscription of a LwM2M client device to one or more LwM2M group management topics may eb implemented from the client side. FIG. 6a illustrates the "automatic subscription" procedure from the client side, and also illustrates how the LwM2M client device may handle group management messages that it is unable to interpret. FIG. 6b illustrates an option in which the LwM2M client device is instructed to subscribe and/or unsubscribe to/from group management topics directly with the MQTT server concerned. FIGS. 6a and 6b present additional steps in the method 400, which may take place before and/or after and/or interspersed with the steps illustrated in FIG. 4, as well as showing how certain steps illustrated in FIG. 4 may be implemented and supplemented to achieve particular functionality.

Referring initially to FIG. 6, according to the automatic subscription procedure, the LwM2M client device may receive, at step 404, a message informing the LwM2M client that it has been subscribed to, or unsubscribed from, at least one group management topic. The message may for example be received via the MQTT server (for example through use of a LwM2M client specific topic as set out in version 1.2 of the LwM2M specification).

In step 410, the LwM2M client device receives a group management message published by a LwM2M server and forwarded to the LwM2M client device by an MQTT server, the group management message specifying a LwM2M group management topic and a management operation to be performed by the LwM2M client device. As illustrated at 410a, a LwM2M group management topic comprises a topic within a LwM2M namespace that is nonspecific to a particular LwM2M endpoint. In step 412, the LwM2M client device may determine whether or not the LwM2M client device is able to interpret the received group management message. If the LwM2M client device is able to interpret the received group management message, then the LwM2M client device proceeds, in step 420, to initiate performance of the management operation.

If the LwM2M client device is unable to interpret the received group management message, it may then check, in step 414, for the presence or absence in the group management message of a parameter that instructs behaviour for any LwM2M client that is forwarded the group management message and is unable to interpret the group management message. If present, the LwM2M client device may additionally determine a value of the parameter. The LwM2M client device may then ignore the group management message in step 416 or send an error message to the MQTT server in step 418 according to whether or not the parameter is present, and/or according to a value of the parameter. Using the parameter to allow devices that cannot interpret the group management message to simply ignore the message may consequently reduce network traffic by avoiding error messages, and may facilitate sending group management messages to a larger group of LwM2M client devices, without needing to worry about the network and the MQTT server having to handle potentially large numbers of error messages.

Referring now to FIG. 6b, which indicates an alternative option for subscribing and unsubscribing the LwM2M client device from group management topics, the LwM2M client device may receive, in step 406, a message creating a new LwM2M object instance to be hosted at the LwM2M client, the new object instance being created for storing group management topics to which the LwM2M client should subscribe. As illustrated at 406a, this may comprise receiving an object management message published by the LwM2M server and forwarded to the LwM2M client device by an MQTT server, the object management message including a topic including an identifier of the LwM2M client, an identification of the "create" management operation, and a payload including an identification of the object instance to be created.

In step 408, the LwM2M client device may receive a message instructing the LwM2M client to subscribe to at least one group management topic at the MQTT server. This may comprise, in step 408a, receiving a subscription management message published by the LwM2M server and forwarded to the LwM2M client device by an MQTT server. The subscription management message includes a topic including an identifier of the LwM2M client, an identification of the "write" management operation, and a payload including an identification of an object instance hosted at the LwM2M client on which the write operation is to be performed, and the group management topics to be written to the object instance and to which the LwM2M client should subscribe.

In other examples, receiving a message instructing the LwM2M client to subscribe to at least one group management topic with the MQTT server may comprise, at 408b, receiving a bootstrap message published by a LwM2M bootstrap server and forwarded to the LwM2M client device by an MQTT server. The bootstrap message includes a topic including an identifier of the LwM2M client, an identification of the "bootstrap-write" operation, and a payload including an identification of a LwM2M object instance hosted at the LwM2M client on which the bootstrap-write operation is to be performed, and the group management topics to be written to the LwM2M object instance and to which the LwM2M client should subscribe. The instruction to subscribe to one or more topics may thus be received as part of a procedure between the LwM2M client device and the LwM2M server device, or as part of a bootstrap procedure between the LwM2M client device and a LwM2M bootstrap server.

In step 409, the LwM2M client device may subscribe to the at least one group management topic at the MQTT server. This may comprise subscribing to the one or more topics included in the payload of the messages received at step 408a or 408b and written to the relevant resource.

In step 456, the LwM2M client device may receive a message instructing the LwM2M client to unsubscribe from at least one group management topic at the MQTT server, for example by receiving a message altering the group management topics written to a relevant resource hosted at the LwM2M client device. In step 458, the LwM2M client device may unsubscribe from the at least one group management topic at the MQTT server.

According to another aspect of the present disclosure there is provided a method performed by an MQTT server. The method comprises receiving a published group management message from a LwM2M server device, the group management message specifying a LwM2M group management topic and a management operation to be performed by one or more LwM2M client devices. The method further comprises forwarding the received group management message to any LwM2M client devices that have subscribed to the LwM2M group management topic specified in the message. The method performed by the MQTT server may further comprise receiving a published automatic subscribe message from the LwM2M server device instructing the MQTT server to subscribe a LwM2M client to at least one LwM2M group management topic, and subscribing the LwM2M client to the at least one LwM2M group management topic. The automatic subscribe message may include an identification of the LwM2M client in a topic specified in the automatic subscribe message, and may identify the group management topic or topics to which the LwM2M client is to be subscribed in the payload of the automatic subscribe message. The method may further comprise sending a confirmation when the LwM2M client has been subscribed to the at least one LwM2M group management topic.

The method performed by the MQTT server may further comprise receiving a published automatic unsubscribe message from the LwM2M server device instructing the MQTT server to unsubscribe a LwM2M client from at least one LwM2M group management topic, and unsubscribing the LwM2M client from the at least one LwM2M group management topic. The automatic unsubscribe message may include an identification of the LwM2M client in a topic specified in the automatic unsubscribe message, and may identify the group management topic or topics from which the LwM2M client is to be unsubscribed in the payload of the automatic subscribe message. The method may further comprise sending a confirmation when the LwM2M client has been unsubscribed from the at least one LwM2M group management topic.

According to another aspect of the present disclosure there is provided a method performed by a LwM2M bootstrap server. The method comprises sending a message to a LwM2M client device instructing the LwM2M client device to subscribe to at least one group management topic at an MQTT server. Sending a message to the LwM2M client device may comprise publishing a bootstrap message to the MQTT server for forwarding to the LwM2M client device, the bootstrap message including a topic including an identifier of the LwM2M client, an identification of the "bootstrap-write" operation, and a payload including an identification of a LwM2M object instance hosted at the LwM2M client on which the bootstrap-write operation is to be performed, and the group management topics to be written to the LwM2M object instance and to which the LwM2M client should subscribe. The method may further comprise sending a message instructing the LwM2M client to unsubscribe from at least one group management topic at the MQTT server. Sending may comprise publishing the message to the MQTT server for forwarding to the LwM2M client device.

There now follows a discussion of examples illustrating how the methods 300 and 400 may be implemented.

The sequence of steps of group management in LwM2M over MQTT, as implemented in the methods 300 and 400, may be summarized as follows:

A LwM2M server creates a topic. Topics are created dynamically when LwM2M devices subscribe or publish to a topic.

Figure 7:
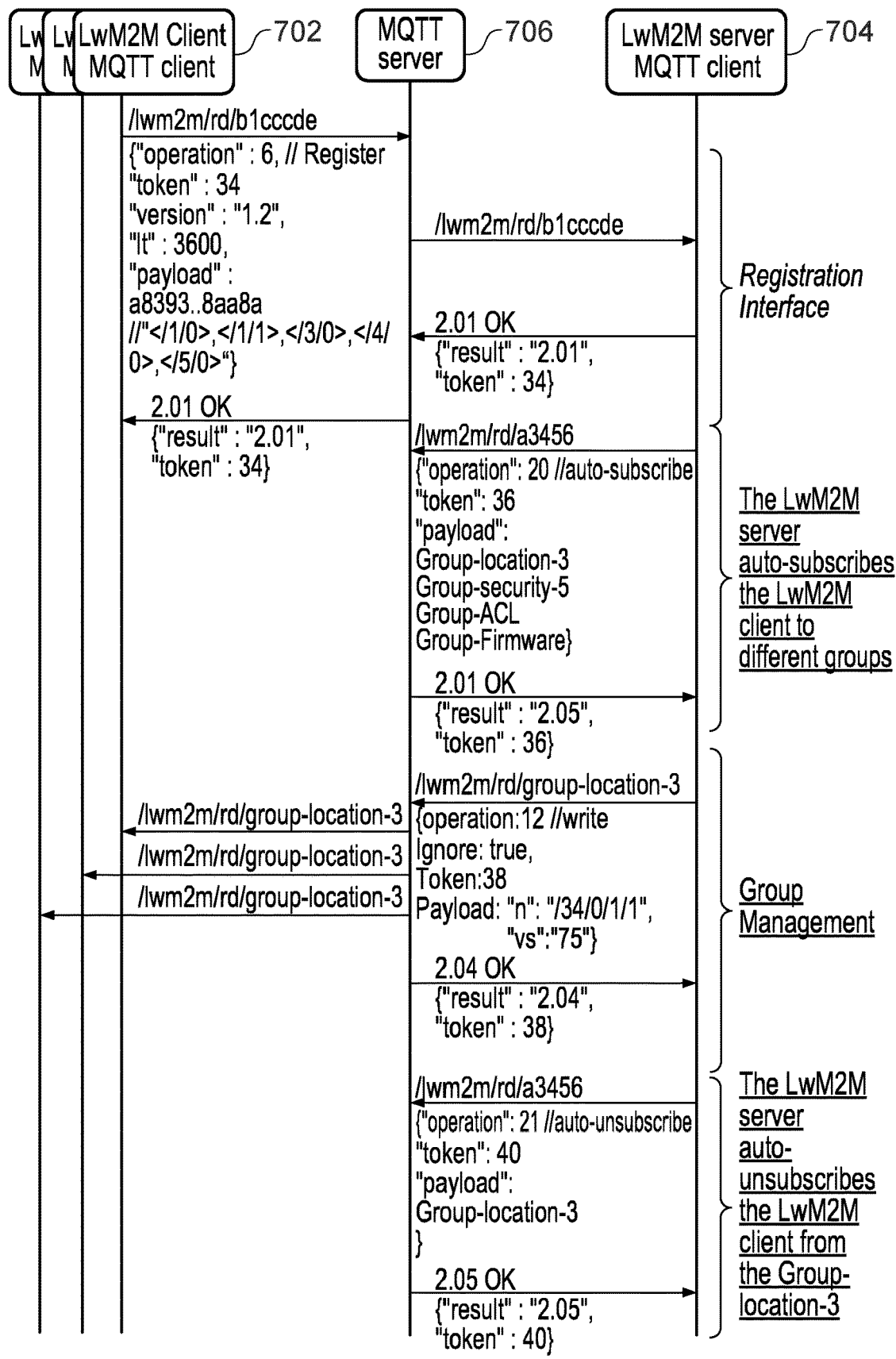
FIG. 7 is a sequence diagram showing an example of group management.
Figure 8:
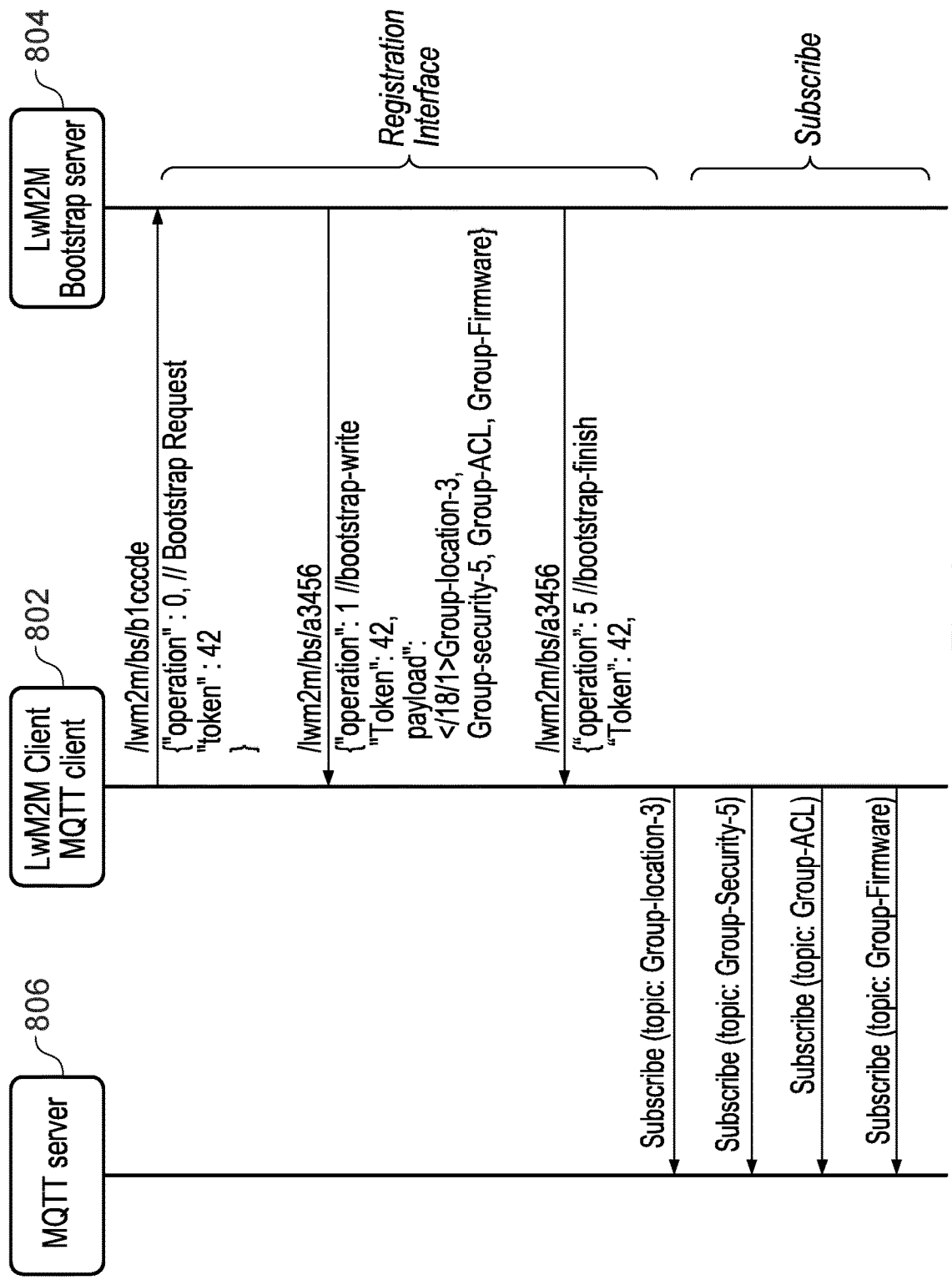
FIG. 8 is a sequence diagram showing another example of group management.
Figure 9:
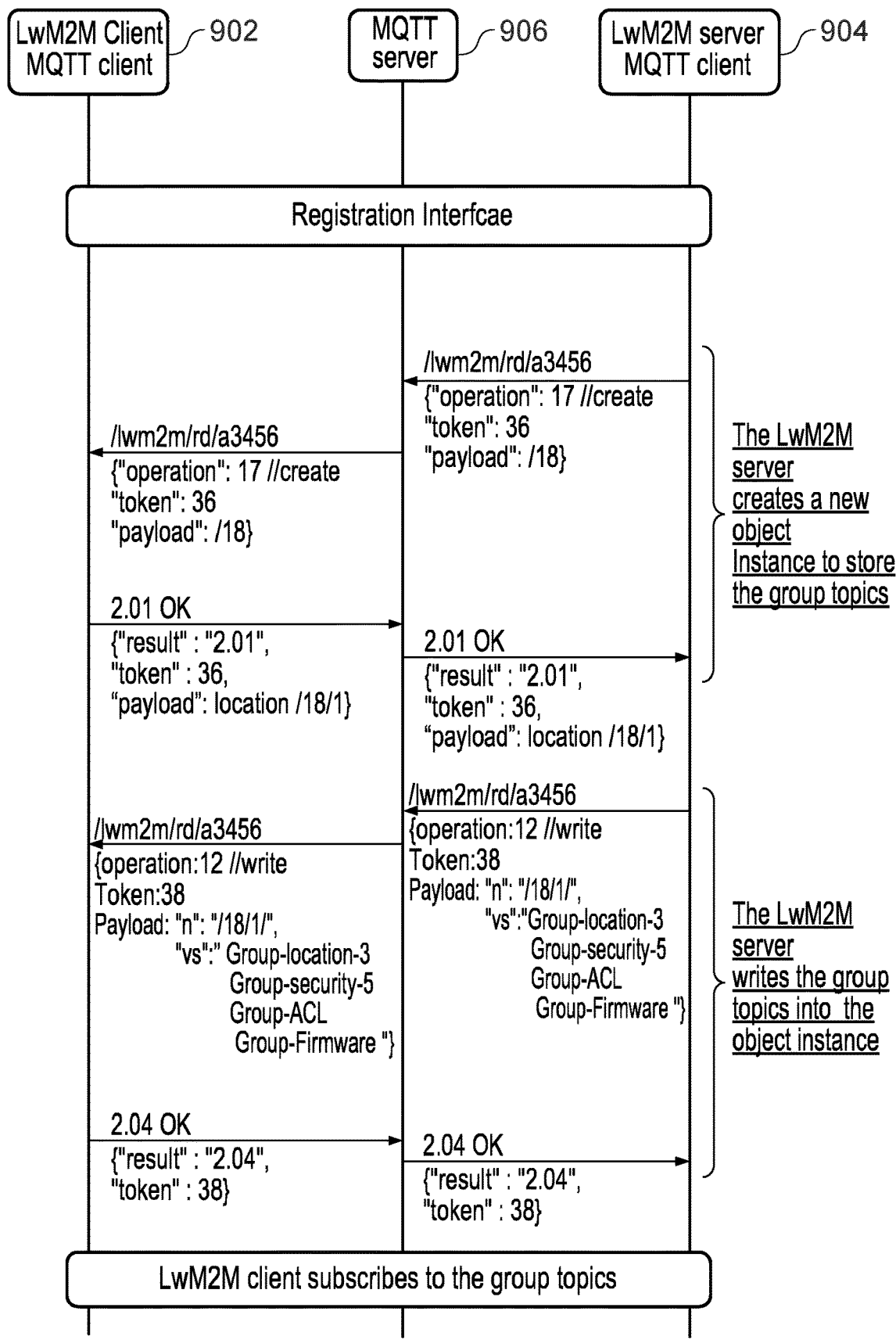
FIG. 9 is a sequence diagram showing another example of group management.

LwM2M clients subscribe to created topics. There are several ways of subscribing to the LwM2M topics. One option (automatic subscription), is for the LwM2M server to subscribe the LwM2M client to different group management topics on its behalf, as illustrated in FIG. 7 below. Another option is for the LwM2M bootstrap server to inform the LwM2M client about the topics to which it should subscribe, as illustrated in FIG. 8 below. A further option is for the LwM2M server to send, for example during the registration phase, the topics to which the LwM2M client should subscribe, as illustrated in FIG. 9 below.

Once the LwM2M clients are subscribed to one or more topics, the LwM2M server can publish management information to the different topics. The MQTT server is the entity responsible for distributing the messages to the different LwM2M clients. As mentioned above, LwM2M clients can be subscribed to several LwM2M management topics at the same time.

LwM2M clients can unsubscribe from any topic at any time. In addition, LwM2M servers can unsubscribe LwM2M clients on their behalf.

FIG. 7 is a sequence diagram showing an example of group management in which LwM2M clients are automatically subscribed to topics by a LwM2M server. In the registration phase, a LwM2M client 702 registers to a LwM2M server 704 through the MQTT server 706. The registration is valid for 3600 seconds and it informs the LwM2M server about the different objects instances and resources the client hosts. This information is described in the payload in CBOR format. The payload structure is:

</1/0>,</1/1>,</3/0>,</4/0>,</5/0>

After receiving the registration message from the LwM2M client, the LwM2M server sends an MQTT 2.05 message back to the LwM2M client.

After registration, the LwM2M server subscribes the LwM2M client to several group management topics using the new automatic subscription procedure described above. In the example illustrated in FIG. 7, this operation is identified with the number 20 but this is merely for the purpose of illustration, and any other suitable identifier could be used instead. The operation includes the identifier of the LwM2M client (a3456) as an ENDPOINT of the operation. The MQTT server therefore knows that the subscribe operation refers specifically to that LwM2M client. The LwM2M server uses the automatic subscription operation to subscribe the LwM2M client to different topics including: Group-location-3, Group-security-5, Group-ACL, and Group-Firmware. Each topic can be used to manage the LwM2M client in a different way. Firmware operations (such as updating the firmware of the LwM2M client) will be sent to the Group-Firmware topic. Management operations related to the security of the device will be sent to the Group-security-5 topic. Management information related to the location of the device will be sent to the Group-location-3. The location in this example refers to the physical location of the device. For example, all the devices belonging to a certain area in a factory could be gathered under the same group management topic, facilitating the combined management of all the devices in that area at once.

Once the MQTT server receives the automatic subscription message from the LwM2M server, it registers the LwM2M client to the identified topics and sends a 2.05 message back to the LwM2M server. The operation "auto-subscribe" described in FIG. 4 is designed to use as few messages as possible. The LwM2M client does not therefore automatically receive notification of subscription. In some scenarios, it might be beneficial for the LwM2M client to be aware of the groups is subscribed to, and consequently, in such cases, the LwM2M server can send a notification to those particular LwM2M clients.

FIG. 7 also illustrates how a group management operation may be implemented. In the illustrated example, the LwM2M server sends a write operation to the topic group-location-3. The operation changes one of the resources of the LwM2M clients subscribed to the group-location-3 topic with another value. The LwM2M server only sends one message to the MQTT server. The MQTT server is then responsible for sending the message to each of the LwM2M clients subscribed to that topic.

As shown in the example of FIG. 7, the group management interface may define another parameter in the automatic subscription operation, named in the present discussion as the "ignore parameter", although other names may be envisaged. The value of the ignore parameter is Boolean and is defined in the management message. When the ignore parameter is true, the LwM2M clients receiving the message can ignore it if they cannot interpret the message, that is if the LwM2M clients cannot understand its content and act upon the message to fulfil the relevant instruction. If the ignore parameter is false, then LwM2M clients must send an error message back to the MQTT server if they are unable to interpret the group management message.

It will be appreciated that when the ignore parameter is present and set to true, group management operations are much more flexible, and a LwM2M server can still send group messages to a group, even if the messages are not meant for every member of the group. In addition, the number of acknowledge messages when LwM2M clients encounter problems with the group management messages is reduced considerably.

The reliability of the group management messages can be also controlled by the Quality of Service (QoS) defined in MQTT. MQTT defines three levels of QoS. In the example of FIG. 7, the QoS between the LwM2M server 704 and the MQTT server 706 is QoS1, meaning that all the received messages between the MQTT server and the LwM2M server are confirmed. The reliability between the LwM2M clients 702 and the MQTT server 706 is QoS0, meaning that the received messages between the LwM2M clients and MQTT server are not confirmed. This scenario is relatively practical to reduce the number of messages between the LwM2M clients and the MQTT server, which in IoT scenarios may already be considerable. QoS2, the safest and slowest QoS level in MQTT is not used in the example of FIG. 7.

The LwM2M server can also unsubscribe LwM2M clients from group management topics. The last two messages in FIG. 7 depict this functionality, using a new operation "auto-unsubscribe". In the illustrated example, the LwM2M server unsubscribes the LwM2M client with the endpoint identifier a3456 from the topic group-location-3. The topic is defined in the payload of the message. In a similar manner to the subscribe operation, this auto-unsubscribe operation is transparent for the LwM2M client; the MQTT server does not inform the LwM2M client about it. FIG. 7 only illustrates unsubscribing from a single topic, but a LwM2M client may be unsubscribed from several topics in a single auto-unsubscribe operation. As for the auto-subscribe operation, the auto-unsubscribe operation is designed to use as few messages as possible, and the LwM2M client does not therefore received any notification from the MQTT server that it has been unsubscribed. In some scenarios however, it may be beneficial for the LwM2M client to be aware of the groups from which it has been unsubscribed. In such cases, the LwM2M server may send a notification to those particular LwM2M clients.

FIG. 8 is a sequence diagram showing another example of group management, in which a LwM2M client is instructed to subscribe to certain group management topics during bootstrap. Referring to FIG. 8, a LwM2M client 802 initiates bootstrapping with a LwM2M bootstrap server 804. Although not illustrated in FIG. 8, communication between the LwM2M client 802 and LwM2M bootstrap server 804 may be performed via an MQTT server 806 using LwM2M over MQTT one-to-one communication as set out above. The LwM2M bootstrap server 804 sends a bootstrap-write operation informing the LwM2M client about the group management topics to which it should subscribe. The identification of the group management topics is stored in a new resource in the LwM2M client. With the bootstrap-write operation, the LwM2M client has to store the value included in the payload of the message in its system, regardless of its existence. The unique identifier of the group-topic resource has been randomly assigned to 18 in the example of FIG. 8, although this is merely for the purposes of illustration, and any other suitable identifier could be envisaged. The LwM2M client 802 then subscribes to the identified group management topics with the MQTT server 806.

FIG. 9 is a sequence diagram showing another example of group management, in which a LwM2M client is instructed to subscribe to certain group management topics by the LwM2M server. Referring to FIG. 9, a LwM2M client 902 initially registers with a LwM2M server 904, for example via an MQTT server 906 using one-to-one LwM2M over MQTT communication as described above. Once the client is registered, the LwM2M server 904 creates a new object instance in the LwM2M client 902, into which it will write the group management topics a LwM2M client should subscribe to. The create operation is used by the LwM2M server to create object instances within the LwM2M client. The Object Instance created in the LwM2M client 902 by the LwM2M server 904 should be an object type supported by the LwM2M client 902 and announced to the LwM2M server 904 using the register and update operations of the LwM2M client 902. The identifier of the group-topic resource is 18 in the example of FIG. 9, but other identifiers may be used. A LwM2M server can modify the information in the created resource (update or delete the information) at any time, and the LwM2M client will subscribe or unsubscribe to the topics according to the information stored in that resource.

As discussed above, the methods 300 and 400 are performed by a LwM2M server device and LwM2M client device respectively. The present disclosure provides a LwM2M server device and LwM2M client device which are adapted to perform any or all of the steps of the above discussed methods. The LwM2M server device and LwM2M client device may comprise constrained devices and/or logical or other functions.

Figure 10:
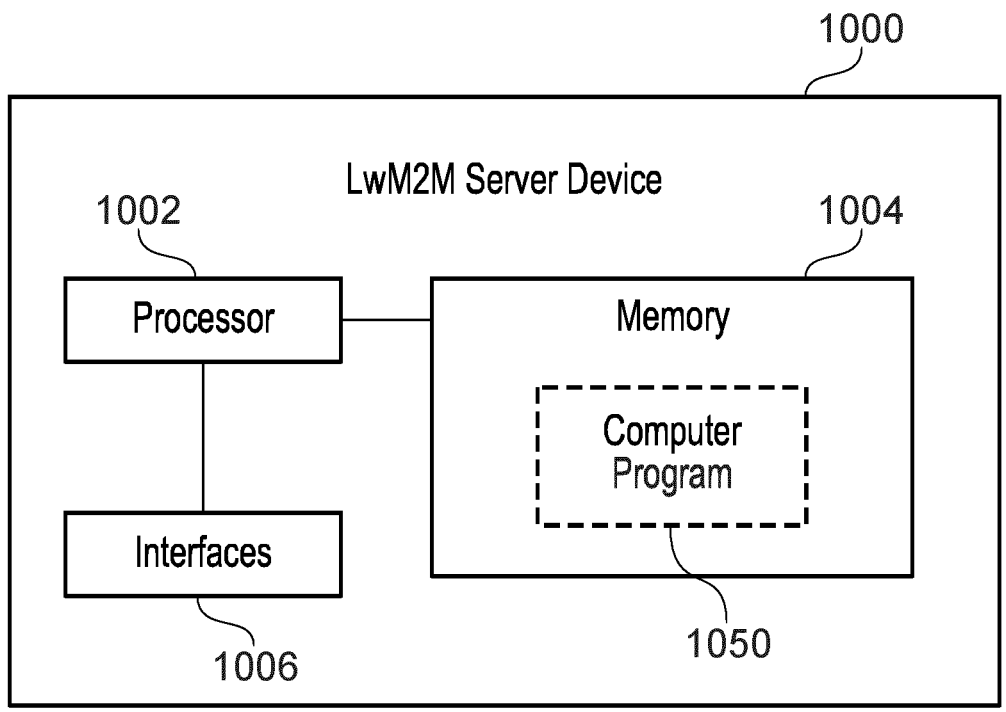
FIG. 10 is a block diagram illustrating functional modules in a LwM2M server device.

FIG. 10 is a block diagram illustrating a LwM2M server device 1000 which may implement the method 300 according to examples of the present disclosure, for example on receipt of suitable instructions from a computer program 1050. Referring to FIG. 10, the LwM2M server device 1000 comprises a processor or processing circuitry 1002, and may comprise a memory 1004 and interfaces 1006. The processing circuitry 1002 is operable to perform some or all of the steps of the method 300 as discussed above with reference to FIGS. 3 and 5a and 5b. The memory 1004 may contain instructions executable by the processing circuitry 1002 such that the LwM2M server device 1000 is operable to perform some or all of the steps of the method 300. The instructions may also include instructions for executing one or more telecommunications and/or data communications protocols. The instructions may be stored in the form of the computer program 1050. The interfaces 1006 may comprise one or more interface circuits supporting wired or wireless communications according to one or more communication protocols. The interfaces 1006 may support exchange of messages in accordance with examples of the methods disclosed herein. In one example, the interfaces 1006 may comprise a LwM2M interface towards a LwM2M client device and an MQTT interface towards an MQTT server.

Figure 11:
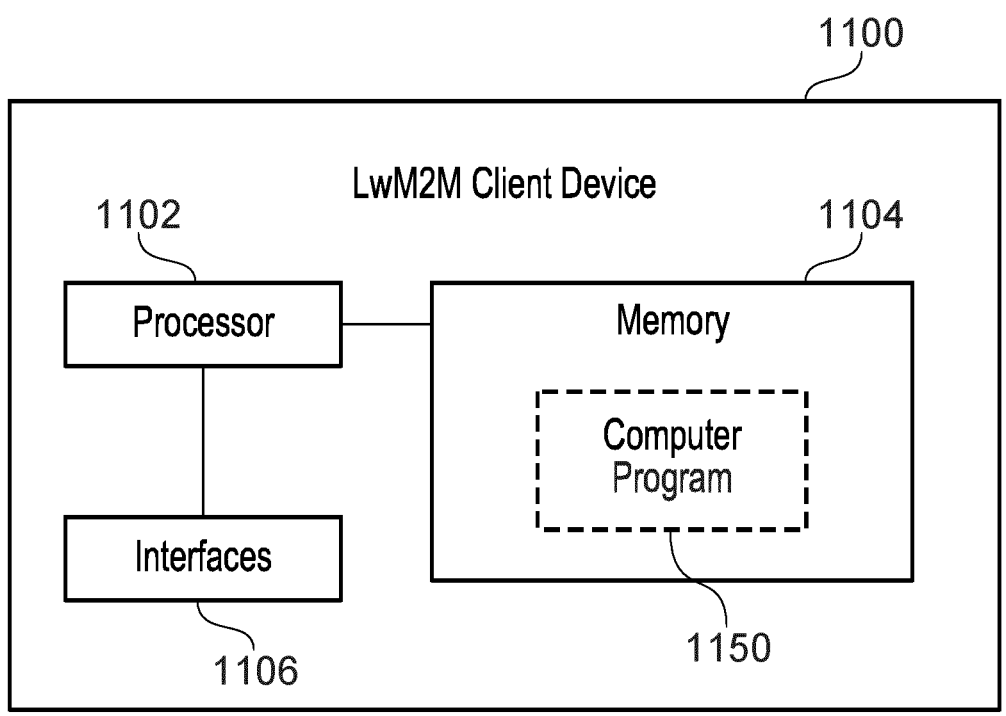
FIG. 11 is a block diagram illustrating functional modules in a LwM2M client device.

FIG. 11 is a block diagram illustrating a LwM2M client device 1100 which may implement the method 400 according to examples of the present disclosure, for example on receipt of suitable instructions from a computer program 1150. Referring to FIG. 11, the LwM2M client device 1100 comprises a processor or processing circuitry 1102, and may comprise a memory 1104 and interfaces 1106. The processing circuitry 1102 is operable to perform some or all of the steps of the method 400 as discussed above with reference to FIGS. 4 and 6a and 6b. The memory 1104 may contain instructions executable by the processing circuitry 1102 such that the LwM2M client device 1100 is operable to perform some or all of the steps of the method 400. The instructions may also include instructions for executing one or more telecommunications and/or data communications protocols. The instructions may be stored in the form of the computer program 1150. The interfaces 1106 may comprise one or more interface circuits supporting wired or wireless communications according to one or more communication protocols. The interfaces 1106 may support exchange of messages in accordance with examples of the methods disclosed herein. In one example, the interfaces 1106 may comprise a LwM2M interface towards a LwM2M server device and an MQTT interface towards an MQTT server.

Examples of the present disclosure thus enable group management of LwM2M devices over MQTT, using newly introduced group management topics. The group management may be implemented and supported using any one or more of several new operations, parameters and message sequences described herein. Examples of the proposed new operations include the auto-subscribe and auto-unsubscribe operations, and the creation, updating and deleting of group management topic resources. The sequence diagrams illustrated show examples of:

- group management (new group operations between the MQTT server and the LwM2M clients);
- auto-subscription of LwM2M clients to group management topics in an MQTT server;
- subscription to group management topics following information provided by a LwM2M bootstrap server; and
- subscription to group management topics following information provided by a LwM2M server.

Group management enables a LwM2M server to send a single group management message to an MQTT server, with the MQTT server distributing that message to all LwM2M clients that have subscribed to the relevant group management topic. The group management provided by the present disclosure reduces the throughput of the network over which the devices communicate, as well as saving battery, CPU and memory in the LwM2M servers. Overall, group management offers an efficient method for managing large groups of LwM2M devices over MQTT.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A Lightweight Machine to Machine (LwM2M) server device operable to run a LwM2M server and a Message Queueing Telemetry Transport (MQTT) client, the LwM2M server device comprising processing circuitry configured to cause the LwM2M server device to:
   determine that a LwM2M management operation should be performed on LwM2M clients running on a device having a certain device property;
   in response to determining that a LwM2M management operation should be performed on LwM2M clients running on a device having the certain device property, performing the following steps:
   1) obtain a LwM2M group management topic corresponding to the device property wherein the LwM2M group management topic is a Unicode Transformation Format-8-bit (UTF-8) string that an MQTT server uses to filter messages for each connected client, LwM2M group management topic is within a LwM2M namespace and the LwM2M group management topic is nonspecific to a particular LwM2M endpoint, and the device property provides a link between LwM2M client devices to be managed and the group management topic;
   2) generate a group management message; and
   3) publish the group management message to the MQTT server, the group management message comprising: the obtained LwM2M group management topic and information indicating the management operation to be performed.

2. The LwM2M server device of claim 1, wherein generating the group management message comprises to:
   set a parameter in the group management message to instruct behavior for any LwM2M clients to which the group management message is forwarded by the MQTT server and which are unable to interpret the group management message; and
   if the parameter in the group management message indicates that any LwM2M clients to which the group management message is forwarded by the MQTT server and which are unable to interpret the group management message may not ignore the group management message, receive an error message, forwarded by the MQTT server, from any LwM2M client to which the group management message was forwarded and which was unable to interpret the group management message.

3. The LwM2M server device of claim 1, wherein the processing circuitry is further configured to cause the LwM2M server device to:
publish an automatic subscribe message to the MQTT server instructing the MQTT server to subscribe a LwM2M client to at least one LwM2M group management topic.

4. The LwM2M server device of claim 3, wherein the processing circuitry is further configured to cause the LwM2M server device to:
include an identification of the LwM2M client in a topic specified in the automatic subscribe message; and
identify the group management topic or topics to which the LwM2M client is to be subscribed in the payload of the automatic subscribe message.

5. The LwM2M server device of claim 1, wherein the processing circuitry is further configured to cause the LwM2M server device to:
publish an automatic unsubscribe message to the MQTT server instructing the MQTT server to unsubscribe a LwM2M client from at least one LwM2M group management topic.

6. The LwM2M server device of claim 5, wherein the processing circuitry is further configured to cause the LwM2M server device to:
include an identification of the LwM2M client in a topic specified in the automatic unsubscribe message; and
identify the group management topic or topics from which the LwM2M client is to be unsubscribed in the payload of the automatic unsubscribe message.

7. The LwM2M server device of claim 1, wherein the processing circuitry is further configured to cause the LwM2M server device to:
instruct a LwM2M client to subscribe to at least one group management topic with the MQTT server by:
publishing a subscription management message to the MQTT server for forwarding to the LwM2M client, the subscription management message including:
a topic including an identifier of the LwM2M client;
an identification of the "write" management operation; and
a payload including: an identification of an object instance hosted at the LwM2M client on which the write operation is to be performed and the group management topics to be written to the object instance and to which the LwM2M client should subscribe.

8. The LwM2M server device of claim 7, wherein the processing circuitry is further configured to cause the LwM2M server device to:
create a new LwM2M object instance to be hosted at the LwM2M client, the new object instance being created for storing group management topics to which the LwM2M client should subscribe.

9. The LwM2M server device of claim 8, wherein the processing circuitry is further configured to cause the LwM2M server device to create the new LwM2M object instance by:
publishing an object management message to the MQTT server for forwarding to the LwM2M client, the object management message including:
a topic including an identifier of the LwM2M client;
an identification of the "create" management operation; and
a payload including an identification of the LwM2M object instance to be created.

10. A Lightweight Machine to Machine (LwM2M) client device operable to run a LwM2M client and a Message Queueing Telemetry Transport (MQTT) client, the LwM2M client device comprising processing circuitry configured to cause the LwM2M client device to:
receive a message generated by a LwM2M server, wherein the message comprises a payload comprising a first LwM2M group management topic to which the LwM2M client should subscribe;
in response to receiving the message, send a subscribe message to an MQTT server to subscribe to the first LwM2M group management topic;
receive a group management message published by the LwM2M server and forwarded to the LwM2M client device by the MQTT server, the group management message specifying:
the first LwM2M group management topic, wherein the first LwM2M group management topic is a Unicode Transformation Format-8-bit (UTF-8) string that the MQTT server uses to filter messages for each connected client, the first LwM2M group management topic is within a LwM2M namespace and the first LwM2M group management topic is nonspecific to a particular LwM2M endpoint; and
a management operation to be performed by the LwM2M client device; and
initiate performance of the management operation.

11. The LwM2M client device of claim 10, wherein the processing circuitry is further configured to cause the LwM2M client device to:
if the LwM2M client device is unable to interpret the received group management message, check for a parameter in the received group management message, the parameter instructing behavior for any LwM2M client that is forwarded the group management message and is unable to interpret the group management message; and
ignore the group management message or send an error message to the MQTT server according to whether or not the parameter is present.

12. The LwM2M client device of claim 11, wherein the processing circuitry is further configured to cause the LwM2M client device to:
if the LwM2M client device is unable to interpret the received group management message and the parameter is present in the received group management message, ignore the group management message or send an error message to the MQTT server according to a value of the parameter.

13. A method performed by a Lightweight Machine to Machine (LwM2M) server device operable to run a LwM2M server and a Message Queueing Telemetry Transport (MQTT) client, the method comprising:
determining that a LwM2M management operation should be performed on LwM2M clients running on a device having a certain device property;
in response to determining that a LwM2M management operation should be performed on LwM2M clients running on a device having the certain device property, performing the following steps:
1) obtaining identifying a LwM2M group management topic corresponding to the device property wherein the LwM2M group management topic is a Unicode Transformation Format-8-bit (UTF-8) string that an MQTT server uses to filter messages for each connected client, LwM2M group management topic is within a LwM2M namespace and the LwM2M group management topic is nonspecific to a particular LwM2M endpoint and the criterion provides a link between LwM2M client devices to be managed and the group management topic;

2) generating a group management message; and 3) publishing the group management message to the MQTT server, the group management message comprising: the obtained LwM2M group management topic and information indicating the management operation to be performed.

14. The method of claim 13, wherein generating the group management message comprises:

setting a parameter in the group management message to instruct behavior for any LwM2M clients to which the group management message is forwarded by the MQTT server and which are unable to interpret the group management message; and if the parameter in the group management message indicates that any LwM2M clients to which the group management message is forwarded by the MQTT server and which are unable to interpret the group management message may not ignore the group management message, receiving an error message, forwarded by the MQTT server, from any LwM2M client to which the group management message was forwarded and which was unable to interpret the group management message.

15. The method of claim 13, further comprising:

publishing an automatic subscribe message to the MQTT server instructing the MQTT server to subscribe a LwM2M client to at least one LwM2M group management topic.

16. The method of claim 15, further comprising:

including an identification of the LwM2M client in a topic specified in the automatic subscribe message; and identifying the group management topic or topics to which the LwM2M client is to be subscribed in the payload of the automatic subscribe message.

17. The method of claim 13, further comprising:

publishing an automatic unsubscribe message to the MQTT server instructing the MQTT server to unsubscribe a LwM2M client from at least one LwM2M group management topic.

18. The method of claim 17, further comprising:

including an identification of the LwM2M client in a topic specified in the automatic unsubscribe message; and identifying the group management topic or topics from which the LwM2M client is to be unsubscribed in the payload of the automatic unsubscribe message.

19. The method of claim 13, further comprising:

instructing a LwM2M client to subscribe to at least one group management topic with the MQTT server by:

publishing a subscription management message to the MQTT server for forwarding to the LwM2M client, the subscription management message including:

a topic including an identifier of the LwM2M client;

an identification of the "write" management operation; and a payload including:

an identification of an object instance hosted at the LwM2M client on which the write operation is to be performed; and the group management topics to be written to the object instance and to which the LwM2M client should subscribe.

20. A computer program product comprising non-transitory computer readable medium storing a computer program comprising instructions which, when executed by processing circuitry of a Lightweight Machine to Machine (LwM2M) server causes the LwM2M server to perform the method of claim 13.

21. The LwM2M server device of claim 1, wherein the device property relates to a device type, a device location, and/or a security level associated with the LwM2M clients.

* * * * *